US 11,524,788 B2

(12) United States Patent
Roth et al.

(10) Patent No.: US 11,524,788 B2
(45) Date of Patent: Dec. 13, 2022

(54) FLOOR FIXING ASSEMBLY WITH CLAMPING SPLIT PIN

(71) Applicant: Airbus Operations GmbH, Hamburg (DE)

(72) Inventors: Ingo Roth, Hamburg (DE); Matthias Hegenbart, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 458 days.

(21) Appl. No.: 16/573,574

(22) Filed: Sep. 17, 2019

(65) Prior Publication Data
US 2020/0086968 A1 Mar. 19, 2020

(30) Foreign Application Priority Data
Sep. 19, 2018 (DE) .......................... 102018122958.5

(51) Int. Cl.
*B64D 11/06* (2006.01)
*B64C 1/20* (2006.01)

(52) U.S. Cl.
CPC ............ *B64D 11/0696* (2013.01); *B64C 1/20* (2013.01)

(58) Field of Classification Search
CPC ................................ B64D 11/0696; B64C 1/20
See application file for complete search history.

(56) References Cited

U.S. PATENT DOCUMENTS

| | | | |
|---|---|---|---|
| 2,409,316 A | 10/1946 | Rogers, Sr. | |
| 3,392,954 A * | 7/1968 | Malitte | A47C 1/12 248/429 |
| 4,026,218 A * | 5/1977 | Prete, Jr. | B60P 7/0815 410/104 |
| 4,440,441 A * | 4/1984 | Marrujo | B60N 2/4221 188/371 |
| 4,496,271 A * | 1/1985 | Spinosa | B64C 1/20 248/503.1 |
| 4,718,719 A * | 1/1988 | Brennan | B64D 11/06 244/122 R |

(Continued)

FOREIGN PATENT DOCUMENTS

| | | |
|---|---|---|
| DE | 3447178 A1 | 7/1986 |
| DE | 102005005574 B3 | 6/2006 |

(Continued)

OTHER PUBLICATIONS

Sennan Search Report; priority document.
European Search Report from Corresponding European Patent Application No. 19197049 dated Jan. 30, 2020.

*Primary Examiner* — Assres H Woldemaryam
*Assistant Examiner* — Shanna Danielle Glover
(74) *Attorney, Agent, or Firm* — Greer, Burns & Crain, Ltd.

(57) ABSTRACT

A floor fixing assembly for releasable fixing of a leg of a frame to a vehicle floor comprises at least one retaining peg which can be fixed to the vehicle floor. The floor fixing assembly furthermore comprises a frame fixing element, which is configured to be connected to the leg of the frame and comprises at least one receiving space for receiving the retaining peg. A clamping device is configured to be introduced into the receiving space of the frame fixing element in order to connect the frame fixing element to the retaining peg by form fit.

20 Claims, 8 Drawing Sheets

(56) References Cited

U.S. PATENT DOCUMENTS

| | | | | |
|---|---|---|---|---|
| 4,733,987 A | * | 3/1988 | Tomlinson | F16B 21/186 285/305 |
| 4,913,489 A | | 4/1990 | Martin | |
| 4,932,816 A | * | 6/1990 | Ligensa | B64D 9/003 244/118.6 |
| 5,178,346 A | * | 1/1993 | Beroth | B64D 9/003 244/118.1 |
| 5,662,446 A | * | 9/1997 | Haan | F16B 21/125 411/530 |
| 5,704,100 A | * | 1/1998 | Swan | F16B 21/186 24/546 |
| 5,762,296 A | * | 6/1998 | Gilbert | B64D 11/0696 244/118.1 |
| 6,260,813 B1 | * | 7/2001 | Whitcomb | B64D 11/0696 244/118.6 |
| 7,393,167 B2 | * | 7/2008 | Dowty | B64D 11/0619 410/105 |
| 7,857,561 B2 | * | 12/2010 | Mejuhas | B64D 11/0696 410/105 |
| D698,629 S | * | 2/2014 | Hansen | D8/370 |
| 10,556,692 B2 | * | 2/2020 | Fuerstenberg | B64D 11/0639 |
| D877,606 S | * | 3/2020 | Strothmann | D8/395 |
| 2007/0018047 A1 | * | 1/2007 | Wodak | B64D 11/0696 244/122 R |
| 2007/0138821 A1 | | 6/2007 | Mejuhas et al. | |
| 2007/0253762 A1 | * | 11/2007 | Hudson | B64D 11/0696 403/83 |
| 2016/0075434 A1 | * | 3/2016 | Siegmeth | B64D 11/0696 297/344.1 |
| 2017/0341756 A1 | | 11/2017 | Fuerstenberg | |

FOREIGN PATENT DOCUMENTS

| | | | | |
|---|---|---|---|---|
| DE | 102005033048 B3 | 1/2007 | | |
| DE | 102016110022 A1 | 11/2017 | | |
| EP | 0021933 A1 | 1/1981 | | |
| EP | 1792827 A2 | 6/2007 | | |
| GB | 1011492 A | * | 12/1965 | B64D 11/0696 |
| WO | WO-2005037594 A2 | * | 4/2005 | B64D 11/0696 |
| WO | WO-2013143701 A2 | * | 10/2013 | B64D 11/0696 |

* cited by examiner

FLOOR FIXING ASSEMBLY WITH CLAMPING SPLIT PIN

CROSS-REFERENCES TO RELATED APPLICATIONS

This application claims the benefit of the German patent application No. 10 2018 122 958.5 filed on Sep. 19, 2018, the entire disclosures of which are incorporated herein by way of reference.

FIELD OF THE INVENTION

The invention concerns a floor fixing assembly for releasable fixing of a frame to a vehicle floor. The invention furthermore concerns a frame fixing system equipped with such a floor fixing assembly, and an aircraft equipped with such a floor fixing assembly and/or such a frame fixing system. Finally, the invention concerns a method for releasably fixing a frame to a vehicle floor.

BACKGROUND OF THE INVENTION

In vehicles, such as for example aircraft, buses, trains, ships etc., seats or seat rows are often attached to seat rails running in the longitudinal direction of the vehicle. Such conventional seat rails normally comprise recurrent openings and constrictions so that the seats or seat rows can be arranged and attached at predefined intervals depending on the spacing of two adjacent constrictions in the longitudinal direction of the seat rails in the vehicle.

In particular, the operators of modern commercial aircraft desire ever more flexible configuration possibilities for the interior of the passenger cabin. These include rapid adaptation of the arrangement of seats or seat rows. For example, seat spacings between seats arranged one behind the other must be able to be changed as quickly and easily as possible so that the passenger cabin can be divided, as quickly, easily and flexibly as possible, into a Business Class zone with more comfortable, larger seat spacings, and an Economy Class zone with smaller seat spacings.

SUMMARY OF THE INVENTION

The invention is based on an object of indicating a floor fixing assembly which allows simple and rapid fixing of monuments, tables, seats and other elements to the floor of a vehicle. The invention is furthermore based on an object of providing a frame fixing system equipped with such a floor fixing assembly, and an aircraft equipped with such a floor fixing assembly and/or such a frame fixing system. Finally, the invention is based on an object of indicating a method which allows rapid and simple fixing of monuments, tables, seats and other elements to the floor of a vehicle.

A floor fixing assembly serves for releasable and hence variable fixing of a leg of a frame to a vehicle floor. The vehicle floor may, for example, be the floor of a passenger cabin of a commercial aircraft, but also a vehicle floor intended for installation in another transport means. The frame, which may be fixed to the vehicle floor by means of the floor fixing assembly, may, for example, be the frame of a passenger seat, but also the supporting frame of any other element or monument to be releasably attached to the vehicle floor.

The floor fixing assembly comprises at least one retaining peg which can be fixed to the vehicle floor. In principle, the retaining peg may assume any shape. Preferably however, the retaining peg has a substantially cylindrical, in particular substantially circular cylindrical form. To fix the retaining peg to the vehicle floor, the vehicle floor may have a bore which is adapted to the shape and size of the retaining peg and in which the retaining peg may be inserted so that, in its state fixed to the vehicle floor, the retaining peg protrudes from the vehicle floor. The retaining peg is preferably rounded in the region of the end thereof that protrudes from the vehicle floor. In a preferred embodiment of the floor fixing assembly, the retaining peg comprises stainless steel and is hence particularly resistant to wear.

Furthermore, the floor fixing assembly comprises a frame fixing element which is configured to be connected to a leg of the frame and comprises at least one receiving space for receiving the retaining peg. The frame fixing element may, for example, have a substantially cuboid base shape. The receiving space provided in the frame fixing element preferably has a shape and size which are adapted to the shape and size of the retaining peg. In particular, the receiving space is designed such that the retaining peg may be received in the receiving space substantially without play. The frame fixing element preferably comprises aluminum, in order to keep the weight of the floor fixing assembly as low as possible.

Furthermore, in the region of an underside of the frame fixing element which faces the vehicle floor in the state in which the floor fixing assembly is mounted on the vehicle floor, the receiving space is preferably configured to be open, so that the frame fixing element can be placed on the retaining peg in order to introduce the retaining peg into the receiving space of the frame fixing element. When the floor fixing assembly comprises several retaining pegs, for example arranged one behind the other in at least one row, the frame fixing element is preferably provided with a corresponding number of receiving spaces, i.e., a corresponding receiving space of the frame fixing element is preferably assigned to each retaining peg. It is however also conceivable that not all receiving spaces provided in the frame fixing element are filled with corresponding retaining pegs.

Finally, the floor fixing assembly comprises a clamping device which is configured to be introduced into the receiving space of the frame fixing element in order to connect the frame fixing element to the retaining peg by form fit. In particular, the clamping device is configured to be arranged in the receiving space of the frame fixing element between an inner face of the receiving space and an outer face of the retaining peg, in order to create a form fit or interference fit between the inner face of the receiving space and the outer face of the retaining peg, and hence between the frame fixing element and the retaining peg, and thus securely connect the frame fixing element to the retaining peg.

In a preferred embodiment of the floor fixing assembly, the at least one retaining peg is formed and can be fixed to the vehicle floor such that its longitudinal axis, in the state in which the floor fixing assembly is mounted on the vehicle floor and fixed to the frame, forms an angle of more than 90° with a main load direction of a load acting in a defined load case on the leg of the frame connected to the frame fixing element. In particular, the longitudinal axis of the retaining peg forms an angle of around 100° with the main load direction. Additionally or alternatively, the retaining peg may be formed and can be fixed to the vehicle floor such that its longitudinal axis, in the state in which the floor fixing assembly is mounted on the vehicle floor and fixed to the frame, and viewed in the direction of a main load direction of a load acting in a defined load case on the leg of the frame connected to the frame fixing element, forms an angle of less than 90° with a plane defined by the vehicle floor. In particular, the longitudinal axis of the retaining peg, viewed in the main load direction, forms an angle of around 80° with the plane defined by the vehicle floor.

The defined load case may, for example, be a load case which occurs during an emergency landing of the aircraft. The main load direction is defined amongst others by the orientation of the frame leg to be attached to the vehicle floor by means of the floor fixing assembly, and, for example, extends substantially coaxially to its longitudinal axis. The arrangement and orientation described here of the retaining peg, relative to the main load direction and relative to the plane defined by the vehicle floor, allows optimized load dissipation and hence a balanced design of the floor fixing assembly without deterioration of its load-absorption capacities.

Accordingly, the receiving space of the frame fixing element provided to receive the retaining peg is preferably formed such that its longitudinal axis, in the state in which the floor fixing assembly is mounted on the vehicle floor, forms an angle of more than 90°, and, in particular, an angle of around 100°, with a main load direction of a load acting in a defined load case on the leg of the frame connected to the frame fixing element. Additionally or alternatively, the receiving space of the frame fixing element provided for receiving the retaining peg may be formed such that its longitudinal axis, in the state in which the floor fixing assembly is mounted on the vehicle floor, and viewed in the direction of a main load direction of a load acting in a defined load case on the leg of the frame connected to the frame fixing element, forms an angle of less than 90°, and, in particular, an angle of around 80°, with a plane defined by the vehicle floor.

The retaining peg may be provided with at least one first groove for receiving the clamping device. For example, the first groove may, in particular, extend substantially parallel to a plane defined by the vehicle floor, so that on connection of the frame fixing element to the retaining peg, the clamping device can be guided by the first groove and, in particular, moved substantially parallel to the plane defined by the vehicle floor. This facilitates mounting of the clamping device. In the state in which the retaining peg is connected to a vehicle floor, the first groove provided on the retaining peg preferably runs substantially parallel to a longitudinal axis of the vehicle.

In the region of its receiving space, the frame fixing element may be provided with at least one second groove for receiving the clamping device. The second groove preferably extends substantially parallel to a plane defined by the vehicle floor, so that on connection of the frame fixing element to the retaining peg, the clamping device can be guided by the second groove and, in particular, moved substantially parallel to the plane defined by the vehicle floor. In the state in which the retaining peg is connected to a vehicle floor, the second groove provided on the frame fixing element preferably runs substantially parallel to a longitudinal axis of the vehicle. When the frame fixing element is placed on the retaining peg, the second groove provided in the region of the receiving space preferably lies opposite the first groove provided on the retaining peg, so that the clamping device can be securely received in the two grooves provided on the frame fixing element and on the retaining peg.

The frame fixing element is preferably provided with a connecting bore which is configured to receive a connecting element for connecting the leg of the frame to the frame fixing element. In one embodiment of the frame fixing element, a longitudinal axis of the connecting bore runs substantially parallel to a plane defined by the vehicle floor. In the state in which the floor fixing assembly is connected to a vehicle floor, the longitudinal axis of the connecting bore may, in particular, extend substantially parallel to a transverse axis of the vehicle. The connecting opening then, in particular, passes through a fixing element which extends from the top side of the frame fixing element. The frame leg may then be connected to the frame fixing element by means of a connecting element which may be introduced into the connecting bore of the frame fixing element, and into a bore of the frame leg aligned therewith, parallel to the plane defined by the vehicle floor. Such a configuration of the frame fixing element allows the connection of the frame fixing element to a frame leg whose longitudinal axis extends at an angle of significantly less than 90°, and, in particular, from around 40° to 70°, relative to the top side of the frame fixing element or the vehicle floor.

In an alternative embodiment of the frame fixing element, a longitudinal axis of the connecting bore extends substantially perpendicularly to a plane defined by the vehicle floor. The connecting bore then, in particular, passes through a top side of the frame fixing element which faces away from the vehicle floor in the state in which the floor fixing assembly is connected to a vehicle floor. The frame leg may then, for example, be connected to the frame fixing element by means of a connecting element which can be introduced into the connecting bore of the frame fixing element, and into the bore of the frame leg aligned therewith, perpendicularly to the plane defined by the vehicle floor. The frame leg may then be fixed, for example, by means of a nut screwed on to the connecting element.

The clamping device may comprise at least one clamping split pin which, in the state in which the floor fixing assembly is mounted on the vehicle floor, runs substantially parallel to a longitudinal axis of the frame fixing element and substantially parallel to a plane defined by the vehicle floor. If desired, the clamping split pin may, in particular, be provided with a third groove which is configured to receive the retaining peg in the state in which the floor fixing assembly is mounted on the vehicle floor. A design of the clamping split pin with a third groove is particularly advantageous when the retaining peg is not provided with a first groove, since the third groove provided on the clamping split pin then facilitates mounting of the clamping split pin.

In a preferred embodiment, the clamping device comprises two clamping split pins. The clamping split pins may be formed separately from each other and may be arranged parallel to each other, at least in the mounted state of the floor fixing assembly. The two clamping split pins of the clamping device may be configured to grip a retaining peg, or several retaining pegs arranged behind one another in a row, on both sides. If desired, the retaining peg or pegs may then be provided with a first groove on both sides. Alternatively, the clamping split pins of the clamping device may, however, also be configured to cooperate with respective outer faces of two retaining pegs or retaining peg rows arranged next to each other. Furthermore, it is conceivable to design the clamping device such that the two clamping split pins are connected together by means of a connecting piece. The clamping split pins may then for example also be configured in sprung fashion, i.e., have a spring preload which forces the two mutually parallel clamping split pins against each other. In this way, the clamping split pins may ensure a particularly secure connection of the frame fixing element with the at least one retaining peg.

The connecting piece may comprise a first element which extends between the clamping split pins and thereby connects the clamping split pins together at least indirectly. Furthermore, the first element of the connecting piece may extend substantially perpendicularly to the clamping split pins. Finally, in the state in which the floor fixing assembly is mounted on the vehicle floor, the first element of the connecting piece may extend substantially parallel to a plane defined by the vehicle floor.

Furthermore, the connecting piece may comprise two second elements which extend towards the outside from respective ends of the clamping split pins. In particular, the second elements of the connecting piece may extend substantially perpendicularly to the clamping split pins, towards the outside from respective ends of the clamping split pins. Preferably, the two second elements are oriented coaxially to each other.

Finally, the connecting piece may comprise two third elements which extend from respective ends of the second elements and connect the second elements to the first element. The two third elements are preferably oriented parallel to each other.

A frame fixing system comprises a vehicle floor and a plurality of retaining pegs fixed to the vehicle floor. For example, the retaining pegs may be inserted in corresponding openings formed in the vehicle floor. The vehicle floor may comprise a panel or several panels which may, for example, comprise a composite material. Furthermore, the frame fixing system comprises a first frame fixing element, which is configured to be connected to a first leg of a frame to be releasably attached to the vehicle floor and comprises the at least one receiving space for receiving a retaining peg. A second frame fixing element of the seat fixing system is configured to be connected to a second leg of the frame to be releasably attached to the vehicle floor and also comprises at least one receiving space for receiving a retaining peg. The frame to be fixed to the vehicle floor may, for example, be a seat frame, but also a supporting frame for another monument or element to be fixed to the vehicle floor.

In addition, the frame fixing system is provided with a first clamping device, which is configured to be introduced into the receiving space of the first frame fixing element in order to connect the first frame fixing element by form fit to at least one retaining peg received in the receiving space of the first frame fixing element. A second clamping device of the frame fixing system is configured to be introduced into the receiving space of the second frame fixing element in order to connect the second frame fixing element by form fit to at least one retaining peg which is received in the receiving space of the second frame fixing element.

The retaining pegs are preferably arranged in the region of a fixing rail provided on the vehicle floor. The retaining pegs may be arranged in a row one behind the other. Furthermore, the frame fixing system may comprise several rows of retaining pegs arranged one behind the other. The fixing rail may be lowered in comparison with a plane defined by the remainder of the vehicle floor. Furthermore, the fixing rail may be provided or covered with a protective or reinforcing element. The protective or reinforcing element may, for example, comprise a glass-fiber material. If the fixing rail is lowered in comparison with a plane defined by the remainder of the vehicle floor, an end of the retaining peg protruding from the vehicle floor lies preferably substantially in the plane defined by the remainder of the vehicle floor, i.e., the extension of the retaining pegs in a direction perpendicular to a plane defined by the lowered fixing rail preferably corresponds to the depth of lowering of the fixing rail relative to the plane defined by the remainder of the vehicle floor.

The floor fixing assembly and/or the frame fixing system described above is/are suitable, in particular, for use in an aircraft. An aircraft therefore comprises a floor fixing assembly and/or a frame fixing system as described above.

In a method for releasable fixing of a leg of a frame to a vehicle floor, firstly at least one retaining peg is fixed to the vehicle floor. Then, a frame fixing element is placed on the retaining peg such that the retaining peg is received in at least one receiving space of the frame fixing element. If several retaining pegs are present, the frame fixing element preferably has several receiving spaces, and is preferably placed on the retaining pegs such that each retaining peg is received in a corresponding receiving space. A clamping device is introduced into the receiving space of the frame fixing element in order to connect the frame fixing element to the retaining peg by form fit. Finally, the leg of the frame to be attached to the vehicle floor is connected to the frame fixing element.

In a preferred variant of the method, a first and a second frame fixing element are each connected by form fit to at least one retaining peg by means of a first and a second clamping device. A first leg of the frame may then be connected to the first frame fixing element, while a second leg of the frame may be connected to the second frame fixing element. The frame may, for example, be a seat frame. The first and second frame fixing elements are preferably connected to retaining pegs arranged one behind the other in a row.

The first leg of the frame may be connected to the first frame fixing element by a first connecting element which is introduced into a connecting bore of the first frame fixing element, the longitudinal axis of the bore extending substantially parallel to a plane defined by the vehicle floor. Such a connection of the first frame leg to the frame fixing element is suitable if a longitudinal axis of the first frame leg, in the state attached to the vehicle floor, extends at an angle of significantly less than 90° and, in particular, approximately 40° to 70° relative to the top side of the frame fixing element or the vehicle floor.

The second leg of the frame may be connected to the second frame fixing element by a second connecting element which is introduced into a connecting bore of the second frame fixing element, the longitudinal axis of the bore extending substantially perpendicularly to a plane defined by the vehicle floor. Such a connection of the second frame leg to the frame fixing element is suitable if the second frame leg, in the state attached to the vehicle floor, extends substantially perpendicularly to the plane defined by the vehicle floor.

BRIEF DESCRIPTION OF THE DRAWINGS

Preferred embodiments of the invention are described in more detail below with reference to the attached diagrammatic drawings, in which.

DETAILED DESCRIPTION OF THE PREFERRED EMBODIMENTS

Figure 1:
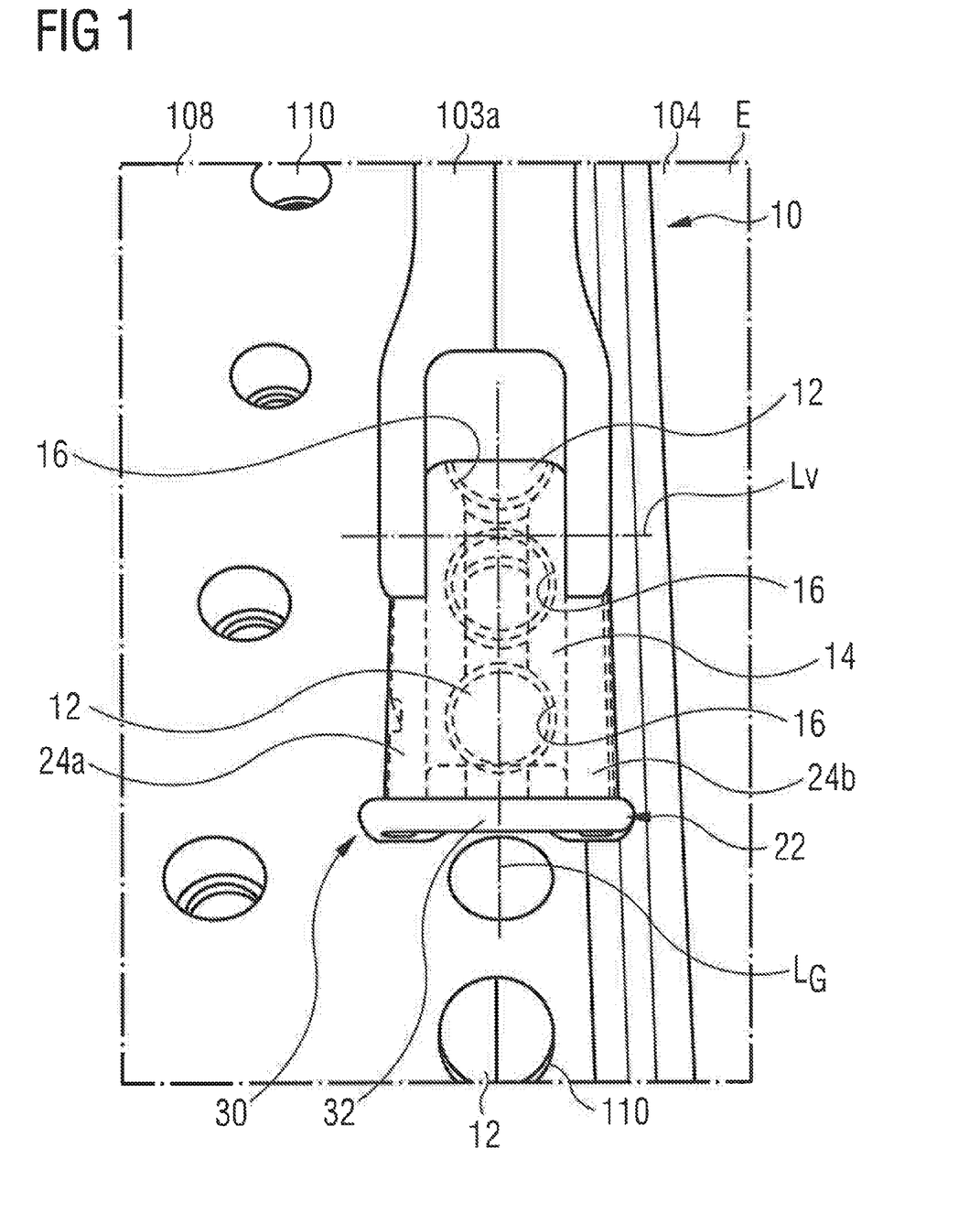
FIGS. 1 to 3 show various views of a floor fixing assembly.
Figure 2:
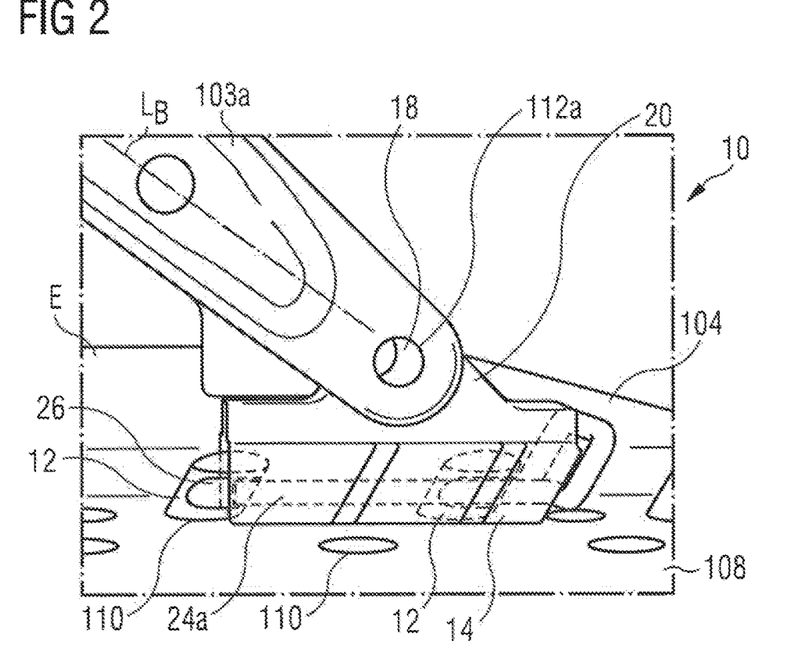
Figure 3:
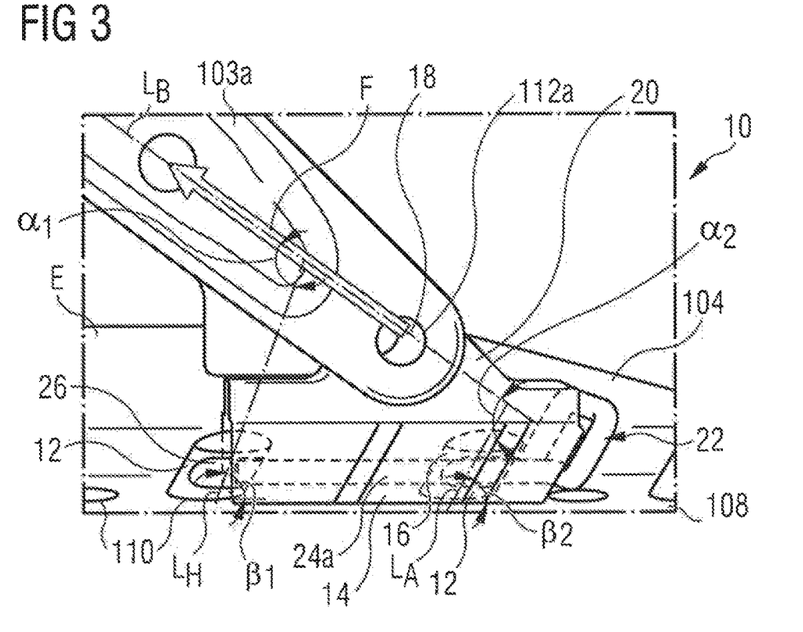

FIGS. 1 to 3 show various views of a floor fixing assembly 10. The floor fixing assembly 10 forms part of a frame fixing system 100, illustrated in more detail in FIG. 10, which serves to attach a frame 102 releasably to a vehicle floor 104. In particular, by means of the floor fixing assembly 10, a leg 103a of the frame 102 can be attached releasably to the vehicle floor 104. In the frame fixing system 100 shown in FIG. 10, the vehicle floor 104 is the floor of the passenger cabin of an aircraft 1000 illustrated in FIG. 11. The frame 102 attached to the vehicle floor 104 by means of the frame fixing system 100 takes the form of a seat frame of a passenger seat 106 in the aircraft 1000 shown in FIG. 11.

The vehicle floor 104 is formed by a plurality of floor panels connected together, and is provided with a fixing rail 108 which is lowered in comparison with a plane defined by the remainder of the vehicle floor 104. In the region of the fixing rail 108, two mutually parallel rows of bores 110 arranged one behind the other are formed in the vehicle floor 104. In the state in which the vehicle floor 104 is mounted in the aircraft 1000, the rows of bores 110 extend substantially parallel to a longitudinal axis of the aircraft 1000, i.e., in the X direction of the aircraft 1000.

The floor fixing assembly 10 shown in FIGS. 1 to 3 comprises at least one retaining peg 12 which can be fixed to the vehicle floor 104. In particular, the embodiment of the floor fixing assembly 10 illustrated in FIGS. 1 to 3 comprises two retaining pegs 12 which are arranged one behind the other in one of the rows of bores 110 formed in the vehicle floor 104. The ends of the retaining pegs 12 protruding from the vehicle floor 104 or from the lowered fixing rail 108 of the vehicle floor 104 are rounded and extend in a plane E which is defined by the remainder of the vehicle floor 104 surrounding the fixing rail 108. Each retaining peg 12 is made of stainless steel.

Figure 4:
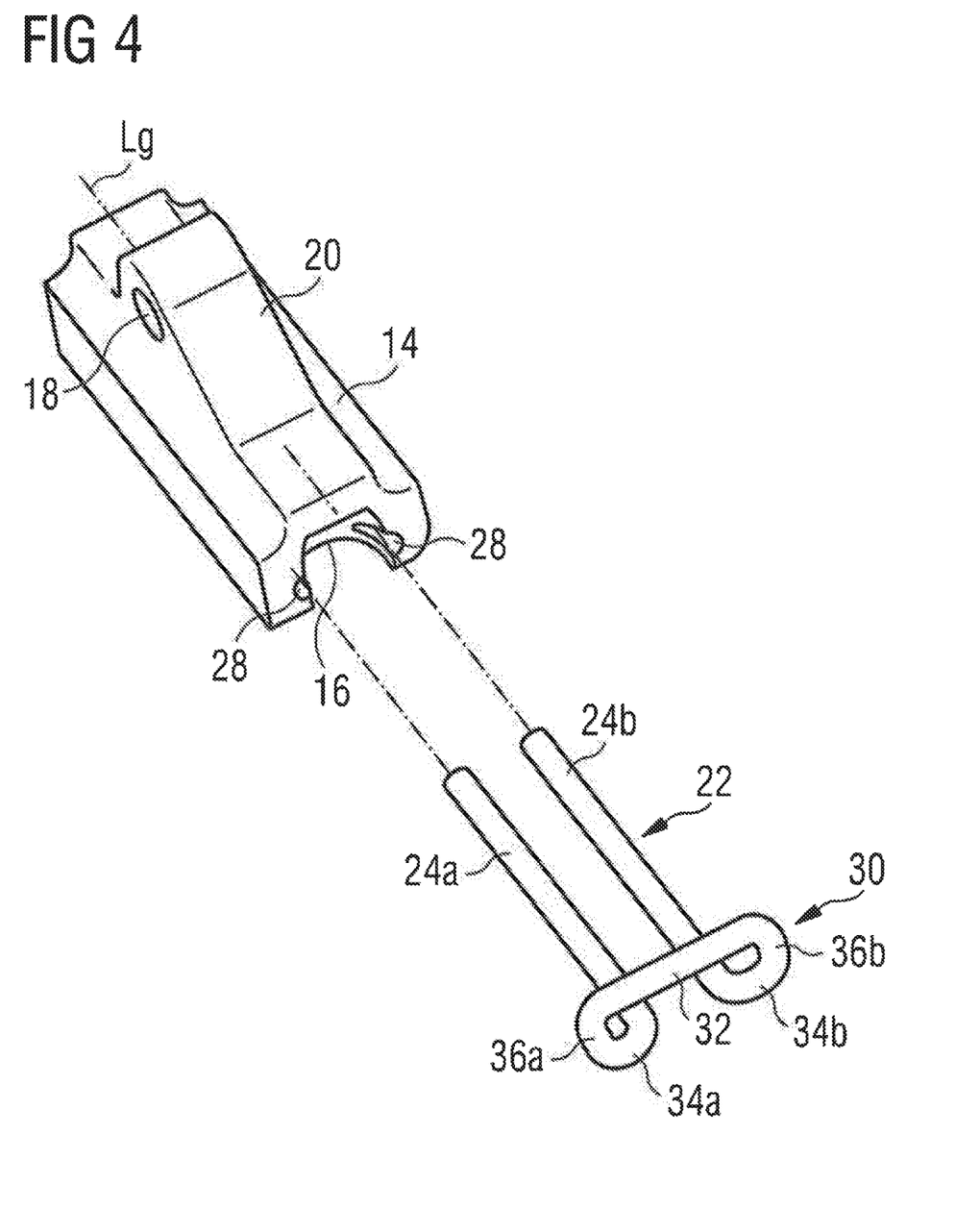
FIGS. 4 to 6 show various views of a frame fixing element and a clamping device of the floor fixing assembly according to FIGS. 1 to 3, FIGS. 7 to 9 show various views of a frame fixing element and a clamping device of an alternative embodiment of a floor fixing assembly.
Figure 5:
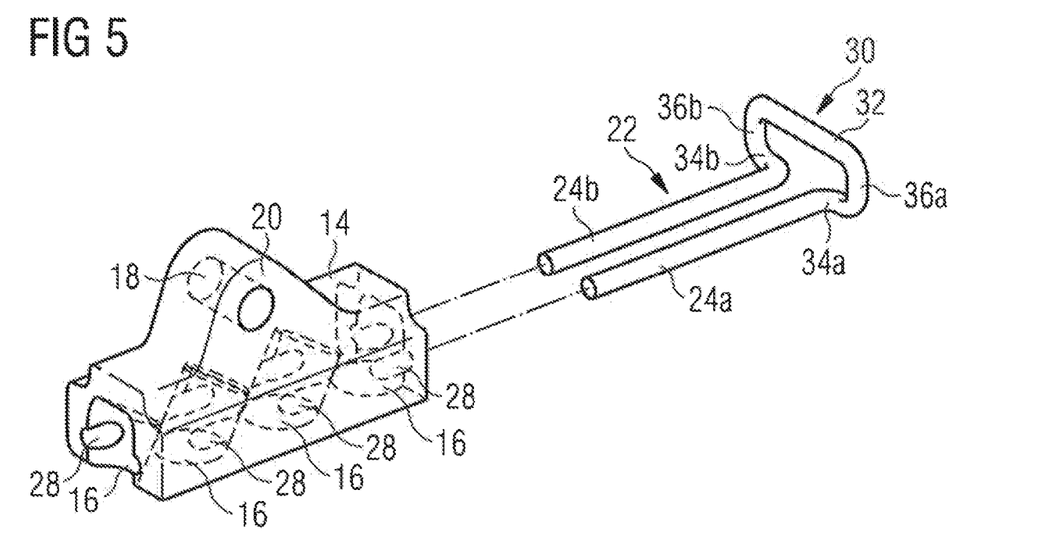
Figure 6:
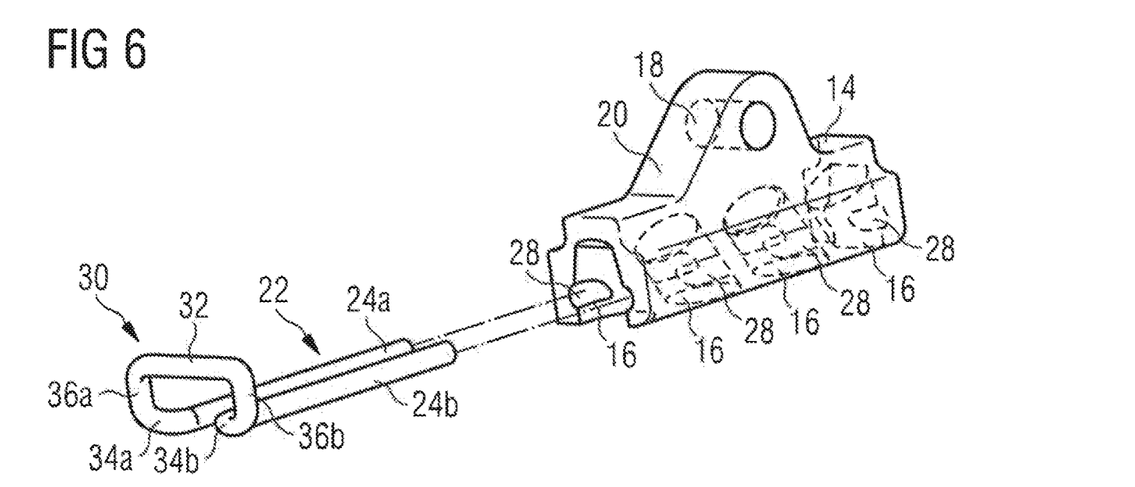

Furthermore, the floor fixing assembly 10 comprises a frame fixing element 14, illustrated in more detail in the exploded depictions in FIGS. 4 to 6. The frame fixing element 14 made of aluminum comprises at least one receiving space 16 for receiving a retaining peg 12. In the embodiment of the floor fixing assembly 10 illustrated in FIGS. 1 to 3, four receiving spaces 16 are provided in the frame fixing element 14 (see, in particular, FIGS. 5 and 6), each of which may receive a retaining peg 12. For this, each of the receiving spaces 16 is adapted to the shape and size of the retaining peg 12 such that a retaining peg 12 can be received substantially play-free in the receiving space 16. Furthermore, in the region of an underside of the frame fixing element 14 facing the vehicle floor 104, each receiving space 16 is formed open so that the frame fixing element 14 can be placed at any desired position on the row of retaining pegs 12, in order for the retaining pegs 12 to be inserted in the corresponding receiving spaces 16 of the frame fixing element 14.

Depending on the positioning of the frame fixing element 14 relative to the row of retaining pegs 12, it is not absolutely essential for each of the receiving spaces 16 provided in the frame fixing element 14 to be filled with a retaining peg 12. For example, in the depiction of FIGS. 1 to 3, only two of the four receiving spaces 16 provided in the frame fixing element 14 are filled with retaining pegs 12, while the other two receiving spaces 16 remain free.

As best seen in FIGS. 1 to 3 and 10, the frame fixing element 14 is configured to be connected to the leg 103a of the frame 102. For this, the frame fixing element 14 is provided with a connecting bore 18. In the frame fixing element 14 shown in FIGS. 1 to 6, the connecting bore 18 passes through a fixing element 20 which extends from a top side of the frame fixing element 14 facing away from the vehicle floor 104. A longitudinal axis LV of the connecting bore 18 extends substantially parallel to the plane E defined by the vehicle floor 104, and substantially parallel to a transverse axis, i.e., in the Y direction of the aircraft 1000.

To connect the frame leg 103a to the frame fixing element 14, the frame leg 103a can be positioned relative to the frame fixing element 14 such that a bore 112a formed in the frame leg 103a aligns with the connecting bore 18 of the frame fixing element 14. Then a connecting element 114a (see FIG. 10) may be inserted into the bore 112a of the frame leg 103a and into the connecting bore 18, and secured, for example, by nuts or other fixing means. Accordingly, the frame fixing element 14 may also be connected to a frame leg 103a, whose longitudinal axis LB extends at an angle of significantly less than 90° and, in particular, as shown, at an angle of around 45° relative to the top side of the frame fixing element 14 or the vehicle floor 104.

As best shown in FIGS. 1 to 3, the retaining pegs 12 do not extend perpendicularly to the plane E defined by the vehicle floor 104. Rather, each retaining peg 12 is formed and fixed to the vehicle floor 104 such that its longitudinal axis LH forms an angle α1 of more than 90° with a main load direction F of a load acting in a defined load case on the frame leg 103a connected to the frame fixing element 14. In particular, the longitudinal axis LH of each retaining peg 12 forms an angle α1 of around 100° with the main load direction F. In addition, each retaining peg 12 is formed and fixed to the vehicle floor 104 such that its longitudinal axis LH, viewed in the direction of the main load direction F, forms an angle β1 of less than 90°, and, in particular, an angle β1 of around 80°, with the plane E defined by the vehicle floor 104.

The defined load case is, in particular, a load case which occurs during an emergency landing of the aircraft 1000. The main load direction F is defined, amongst others, by the orientation of the frame leg 103a attached to the vehicle floor 104 by means of the floor fixing assembly 10, and here extends substantially coaxially to the longitudinal axis LB of the frame leg 103a. The arrangement and orientation described here of the retaining pegs 12, relative to the main load direction F and relative to the plane E defined by the vehicle floor 104, allows optimized load dissipation and hence a balanced design of the floor fixing assembly 10 without deterioration of its load-absorption capacities.

Accordingly, each receiving space 16 of the frame fixing element 14 provided to receive the retaining pegs 12 is formed such that its longitudinal axis LA forms an angle α2 of more than 90°, and, in particular, an angle α2 of around 100°, with the main load direction F. Furthermore, each receiving space 16 of the frame fixing element 14 is formed such that its longitudinal axis LA, viewed in the direction of the main load direction F, forms an angle β2 of less than 90°, and, in particular, an angle β2 of around 80°, with the plane E defined by the vehicle floor 104.

Finally, the floor fixing assembly 10 comprises a clamping device 22 which is configured to be introduced into the at least one receiving space 16 of the frame fixing element 14, in order to connect the frame fixing element 14 by form fit to the retaining peg 12 received in the receiving space 16. In particular, the clamping device 22 or a portion of the clamping device 22 may be arranged between an inner face of the receiving space 16 and an outer face of the retaining peg 12 received in the receiving space 16, in order to create a form fit or interference fit between the inner face of the receiving space 16 and the outer face of the retaining peg 12, and hence between the frame fixing element 14 and the retaining peg 12.

The clamping device 22 comprises two clamping split pins 24a, 24b which extend parallel to each other, parallel to a longitudinal axis LG of the frame fixing element 14, and parallel to the plane E defined by the vehicle floor 104 in the X direction of the aircraft 1000. In the floor fixing assembly 10 shown in FIGS. 1 to 3, the two clamping split pins 24a, 24b of the clamping device 22 are configured to grip the retaining pegs 12, received in the receiving spaces 16 of the frame fixing element 14, on both sides. In order to facilitate installation of the clamping device 22 and, in particular, the insertion of the clamping split pins 24a, 24b of the clamping device 22 between the inner faces of the receiving spaces 16 formed in the frame fixing element 14 and the outer faces of the retaining pegs 12, the retaining pegs 12 are provided with at least one first groove 26 for receiving the clamping device 22. Furthermore, in the region of the receiving spaces 16, the frame fixing element 14 is provided with at least one second groove 28 for receiving the clamping device 22.

In particular, in the region of their outer faces, the retaining pegs 12 are provided on both sides with a first groove 26 which extends parallel to the plane E defined by the vehicle floor 104 in the X direction of the aircraft 1000, and the shape and size of which are adapted to the shape and size of the clamping split pins 24a, 24b of the clamping device 22. Opposite each first groove 26 is a second groove 28 which is formed in the respective inner face of the receiving space 16 provided in the frame fixing element 14, and extends parallel to the first groove 26 and hence also parallel to the plane E defined by the vehicle floor 104 in the X direction of the aircraft 1000. Accordingly, the clamping split pins 24a, 24b of the clamping device 22 can be guided by the grooves 26, 24 and also introduced into the receiving spaces 16 of the frame fixing element 14 parallel to the plane E defined by the vehicle floor 104 in the X direction of the aircraft 100, i.e., introduced between the inner faces of the receiving spaces 16 formed in the frame fixing element 14 and the outer faces of the retaining pegs 12, in order to create the desired form fit or interference fit between the frame fixing element 14 and the retaining pegs 12.

In the clamping device 22 of the floor fixing assembly 10 shown in FIGS. 1 to 3, the two clamping split pins 24a, 24b are formed in sprung fashion and connected together by means of a connecting piece 30. In particular, the clamping split pins 24a, 24b have a spring preload which pushes the two mutually parallel clamping split pins 24a, 24b towards each other and hence ensures a particularly secure clamping of the retaining peg 12 by the clamping split pins 24a, 24b.

The connecting piece 30 comprises a first element 32 which extends between the clamping split pins 24a, 24b, substantially perpendicularly to the clamping split pins 24a, 24b, and hence connects the clamping split pins 24a, 24b together at least indirectly. In the state in which the floor fixing assembly 10 is mounted in the vehicle floor 104, the first element 32 of the connecting piece 30 extends substantially parallel to the plane E defined by the vehicle floor 104. Furthermore, the connecting piece 30 comprises two second elements 34a, 34b which extend substantially perpendicularly to the clamping split pins 24a, 24b, towards the outside from respective ends of the clamping split pins 24a, 24b. The two second elements 34a, 34b are oriented coaxially to each other.

Finally, the connecting piece 30 comprises two third elements 36a, 36b which extend from respective ends of the second elements 34a, 34b and connect the second elements 34a, 34b to the first element 32. The two third elements 36a, 36b of the connecting piece 30 are oriented parallel to each other and extend substantially perpendicularly to the two second elements 34a, 34b. As is evident from FIGS. 4 to 6, in the non-mounted state of the floor fixing assembly 10, the two third elements 36a, 36b of the connecting piece 30 also extend substantially perpendicularly to the clamping split pins 24a, 24b. However, in the mounted state of the floor fixing assembly 10, the two third elements 36a, 36b of the connecting piece 30 form an angle of around 115° with the clamping split pins 24a, 24b. The clamping device 22 is thus set under a spring preload which counters a release of the clamping device 22 from its position in engagement with the retaining pegs 12 and the frame fixing element 14.

In order to attach the frame leg 103a releasably to the vehicle floor 104, firstly at least one retaining peg 12 is fixed to the vehicle floor 104. In particular, a plurality of retaining pegs 12, arranged one behind the other in at least one row, is inserted in the bores 110 formed in the fixing rail 108 of the vehicle floor 104 (see FIGS. 1 to 3 and 10). Then the frame fixing element 14 is placed on the retaining pegs 12 such that the retaining pegs 12 are received in the corresponding receiving spaces 16 of the frame fixing element 14. Finally, the clamping device 22 is introduced into the receiving spaces 16 of the frame fixing element 14 in order to connect the frame fixing element 14 by form fit to the retaining pegs 12. Finally, the frame leg 103a is connected to the frame fixing element 14.

Figure 9:
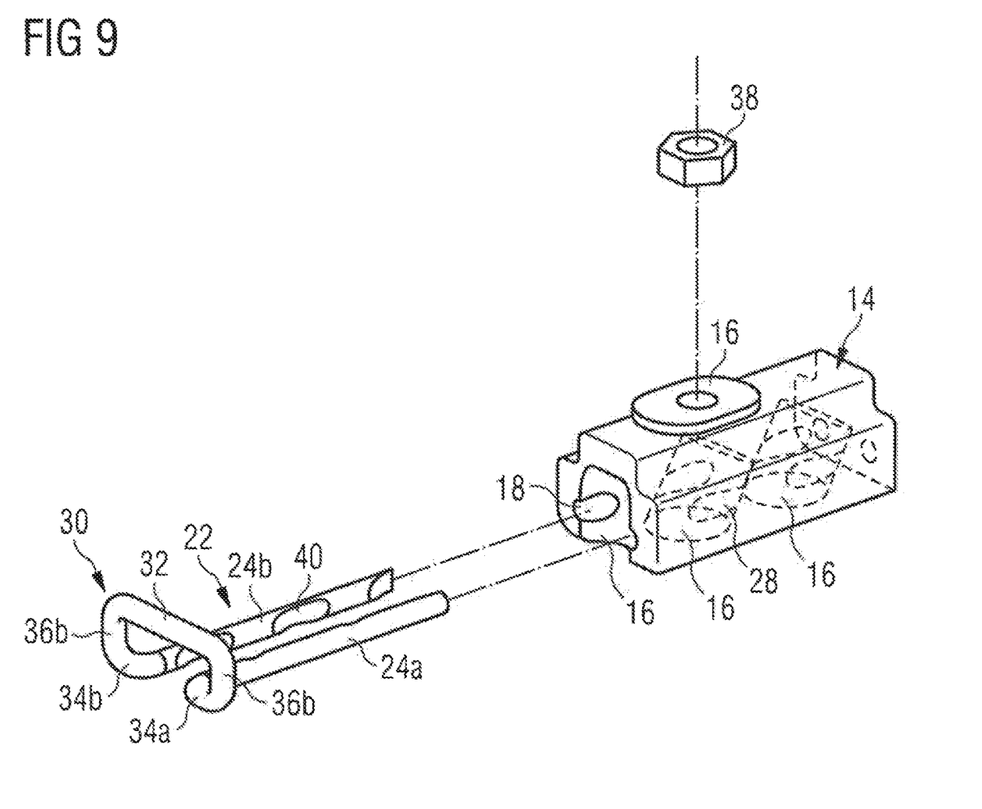
Figure 10:
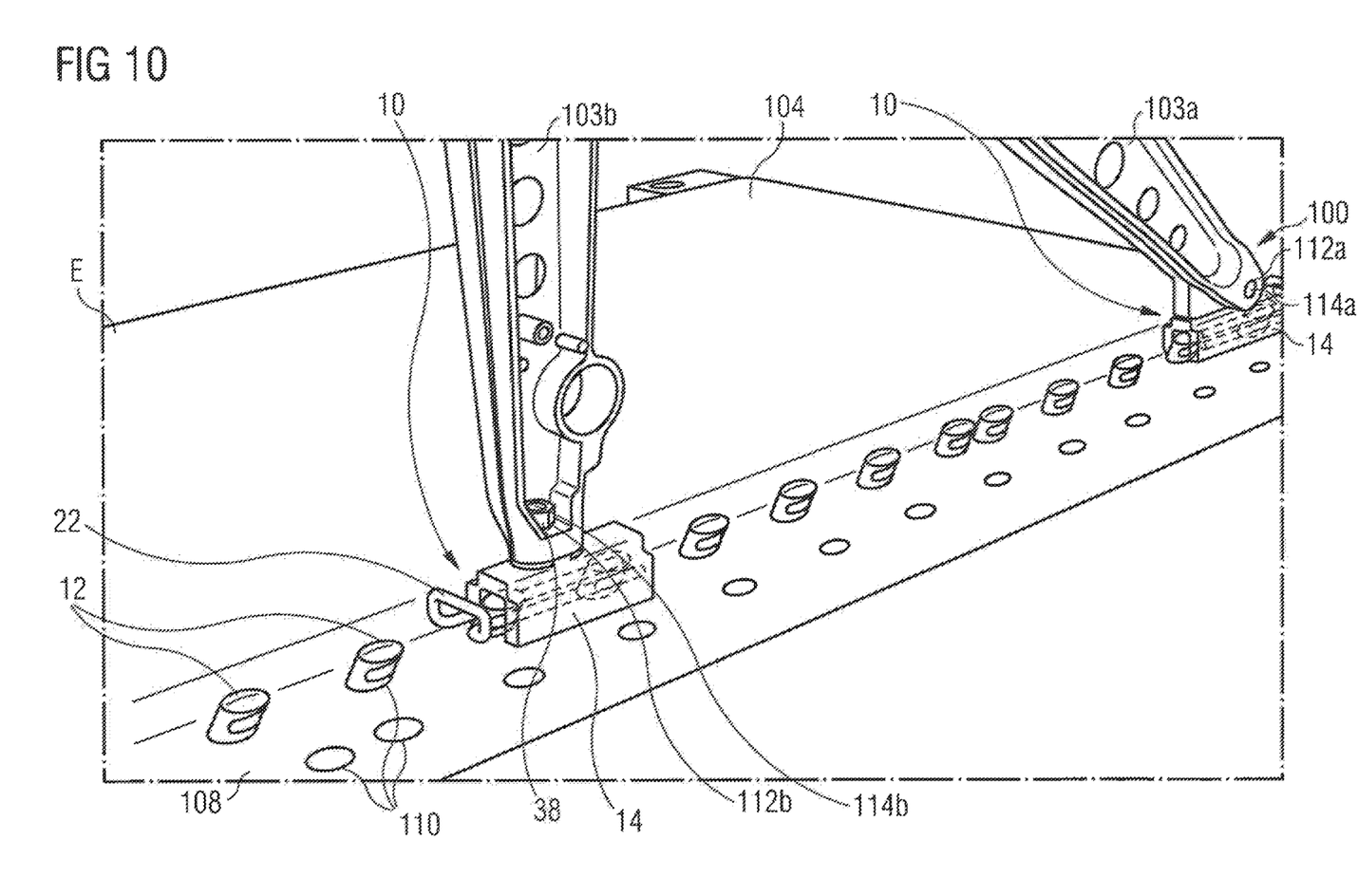
FIG. 10 shows a frame fixing system which comprises a floor fixing assembly according to FIGS. 1 to 3, and a floor fixing assembly with a frame fixing element and a clamping device according to FIGS. 7 to 9.

The frame fixing system 100 shown in FIG. 10 serves to attach a frame 102—which comprises a further leg 103b as well as the leg 103a—releasably to the vehicle floor 104. In contrast to the leg 103a, however, the further leg 103b does not extend at an angle of around 45° relative to the top side of the frame fixing element 14 or the vehicle floor 104. Instead, the further frame leg 103b extends substantially perpendicularly to the top side of the frame fixing element 14 or the vehicle floor 104. The floor fixing assembly 10 used to fix the further frame leg 103b to the vehicle floor 104 therefore has a modified frame fixing element 14 which is shown in detail in FIGS. 7 to 9.

Figure 7:
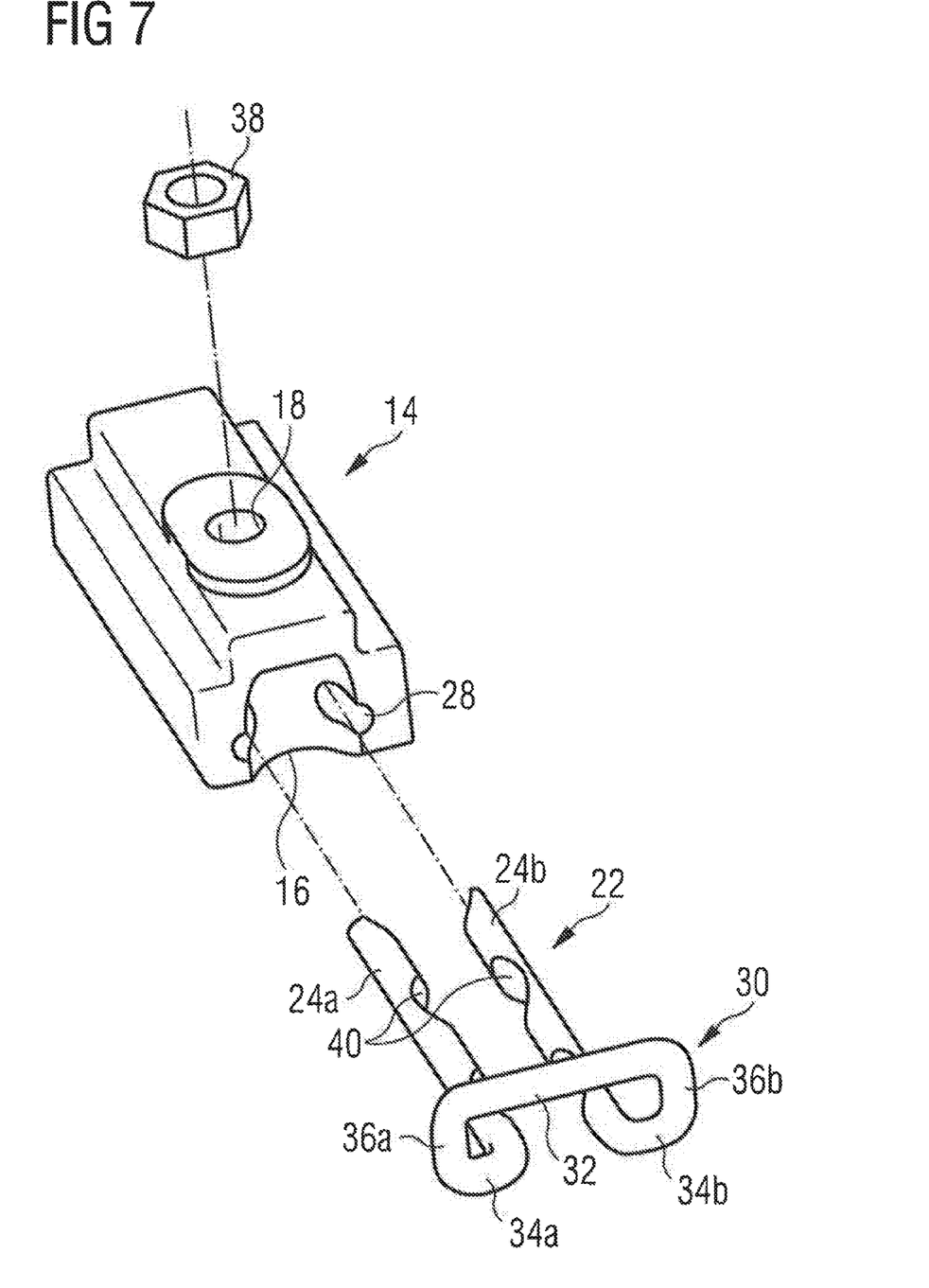
Figure 8:
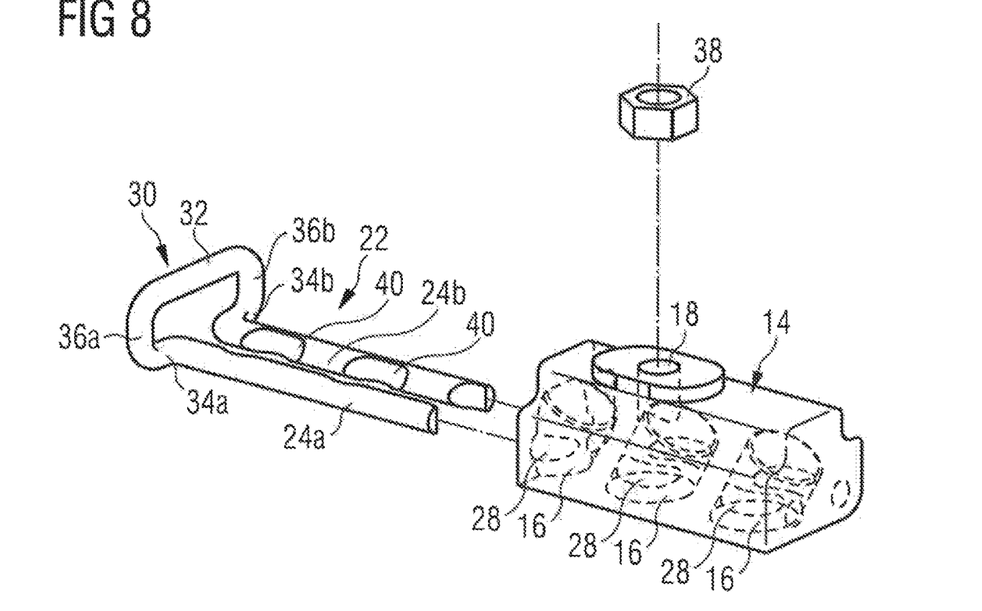

The frame fixing element 14 shown in FIGS. 7 to 9 differs from the frame fixing element 14 illustrated in FIGS. 1 to 6 in that the frame fixing element 14 according to FIGS. 7 to 9 has a connecting bore 18, whose longitudinal axis LV extends substantially perpendicularly to the plane E defined by the vehicle floor 104. Furthermore, the connecting bore 18 passes through a top side of the frame fixing element 14 which faces away from the vehicle floor 104 in the state in which the floor fixing assembly 10 is connected to the vehicle floor 104. To connect the further frame leg 103b to the frame fixing element 14, a connecting element 114b (indicated diagrammatically in FIG. 10) is introduced perpendicularly to the plane E defined by the vehicle floor 104 into the connecting bore 18 of the frame fixing element 14, and into a bore 112b of the further frame leg 103b aligned therewith, and fixed by means of a nut 38 screwed onto the connecting element 114b.

Furthermore, the clamping device 22 shown in FIGS. 7 to 9 differs from the clamping device 22 illustrated in FIGS. 4 to 6. In particular, the clamping split pins 24a, 24b of the clamping device 22 are provided with third grooves 40 in the region of their inner faces. Each of the third grooves 40 is configured to receive a retaining peg 12 such that an outer face of the retaining peg 12 facing the respective clamping split pin 24a, 24b bears on an inner face of the groove 40. The design of the clamping split pins 24a, 24b with third grooves 40 is advantageous, in particular, if the retaining pegs 12 do not have first grooves 26, since the third grooves provided on the clamping split pin 24a, 24b then facilitate mounting of the clamping split pin 24a, 24b.

To fix the frame 102 comprising the two legs 103a, 103b to the vehicle floor 104, firstly a first and a second frame fixing element 14 are each connected by form fit to at least one retaining peg 12 by means of a first and a second clamping device 22 respectively, wherein the first frame fixing element 14 is a frame fixing element 14 as shown in FIGS. 1 to 6, while the second frame fixing element 14 is a frame fixing element 14 as shown in FIGS. 7 to 9. Since, in the frame fixing system 100 shown in FIG. 10, all retaining pegs 12 are provided with first grooves 26 on both sides, both the first and the second clamping device 22 may be designed in the form of a clamping device as shown in FIGS. 4 to 6, in which the clamping split pins 24a, 24b do not have third grooves.

The frame leg 103a is connected by the connecting element 114a to the first frame fixing element 14, wherein the connecting element 114a is introduced into the connecting bore 18 of the first frame fixing element 14 and into the bore 114a of the frame leg 103a aligned with the connecting bore 18. The further frame leg 103b is connected by the connecting element 114b to the second frame fixing element 14, wherein the connecting element 114b is introduced into the connecting bore 18 of the second frame fixing element 14 and into the bore 114b of the further frame leg 103b aligned with the connecting bore 18, and finally fixed by means of the nut 38.

Figure 11:
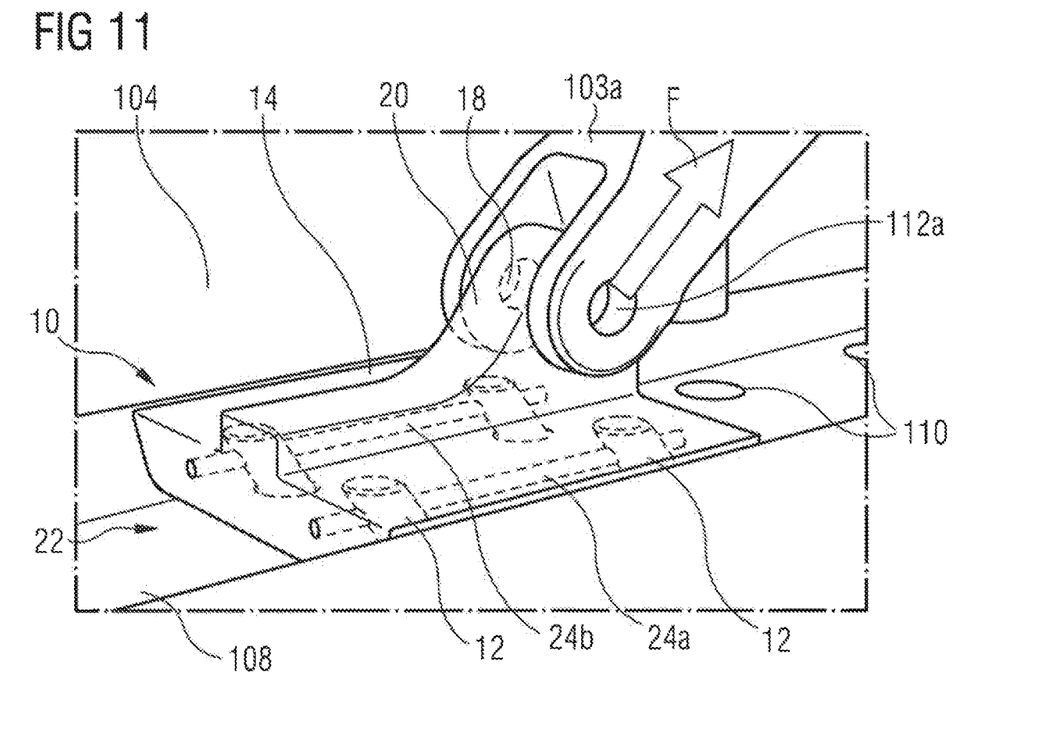
FIG. 11 shows a further alternative embodiment of a floor fixing assembly.
Figure 12:
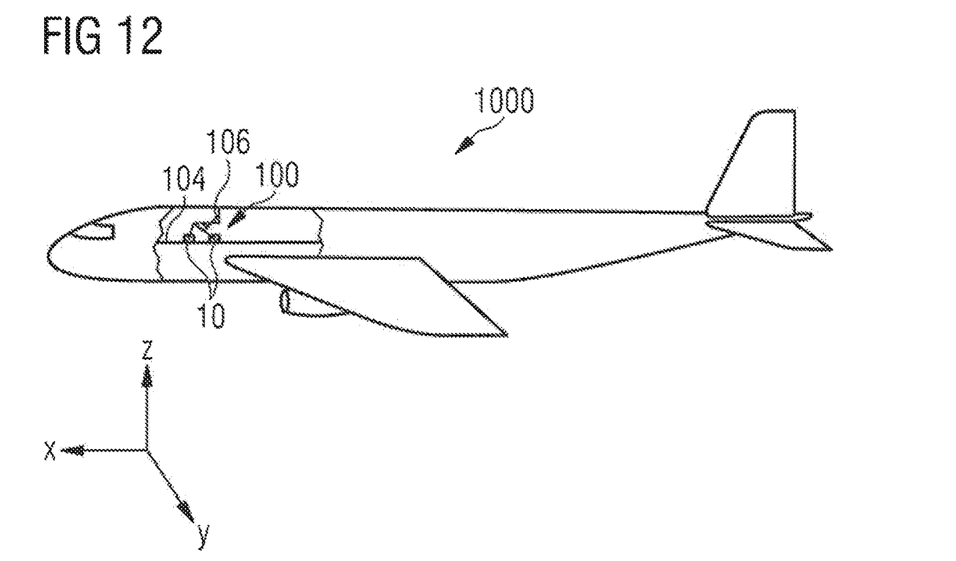
FIG. 12 shows an aircraft with a frame fixing system according to FIG. 10.

The alternative embodiment of a floor fixing assembly 10 shown in FIG. 11 differs from the arrangement illustrated in FIGS. 1 to 3 in that the retaining pegs 12 are arranged in two mutually parallel rows, i.e., retaining pegs 12 are inserted in both rows of bores 110 formed in the fixing rail 108 of the vehicle floor 104. Accordingly, the frame fixing element 14 is also provided with two rows of receiving spaces 16. In the floor fixing assembly 10 shown in FIG. 11, the clamping device 22 comprises two clamping split pins 24a, 24b which are formed separately from each other. Otherwise, the structure and function of the floor fixing assembly 10 in FIG. 11 correspond to the structure and function of the arrangement illustrated in FIGS. 1 to 3.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A floor fixing assembly for releasable fixing of a leg of a frame to a vehicle floor, comprising:
    at least one retaining peg configured to be fixed to the vehicle floor,
    a frame fixing element configured to be connected to the leg of the frame and comprises at least one receiving space for receiving the retaining peg, and
    a clamping device configured to be introduced into the receiving space of the frame fixing element in order to connect the frame fixing element to the retaining peg by form fit,
    wherein the clamping device comprises two clamping split pins which, in a state in which the floor fixing assembly is mounted on the vehicle floor, runs substantially parallel to a longitudinal axis of the frame fixing element and substantially parallel to a plane defined by the vehicle floor, wherein each clamping split pin engages one retaining peg and the frame fixing element, and
    wherein the two clamping split pins are connected by a connecting piece that extends in a plane parallel to the plane defined by the vehicle floor and extends in a plane that is perpendicular to the plane defined by the vehicle floor; and
    wherein the connecting piece is dimensioned larger than the receiving space.

2. The floor fixing assembly according to claim 1, wherein the retaining peg is formed and is configured to be fixed to the vehicle floor such that its longitudinal axis, in a state in which the floor fixing assembly is mounted on the vehicle floor and connected to the frame, forms an angle of more than 90° with a main load direction of a load acting in a defined load case on the leg of the frame connected to the frame fixing element.

3. The floor fixing assembly according to claim 1, wherein the retaining peg is formed and is configured to be fixed to the vehicle floor such that its longitudinal axis, in a state in which the floor fixing assembly is mounted on the vehicle floor and fixed to the frame, and viewed in a direction of a main load direction of a load acting in a defined load case on the leg of the frame connected to the frame fixing element, forms an angle of less than 90 with a plane defined by the vehicle floor.

4. The floor fixing assembly according to claim 1, wherein the receiving space of the floor fixing assembly is formed such that its longitudinal axis, in a state in which the floor fixing assembly is mounted on the vehicle floor, forms an angle of more than 90° with a main load direction of a load acting in a defined load case on the leg of the frame connected to the frame fixing element.

5. The floor fixing assembly according to claim 1, wherein the receiving space of the floor fixing assembly is formed such that its longitudinal axis, in a state in which the floor fixing assembly is mounted on the vehicle floor, and viewed in a direction of a main load direction of a load acting in a defined load case on the leg of the frame connected to the frame fixing element, forms an angle of less than 90° with a plane defined by the vehicle floor.

6. The floor fixing assembly according to claim 1,
    wherein the retaining peg is provided with at least one first groove for receiving one of the clamping split pins,
    wherein the first groove extends substantially parallel to the plane defined by the vehicle floor, so that on connection of the frame fixing element to the retaining peg, the respective clamping split pin is guided by the first groove and moved substantially parallel to the plane defined by the vehicle floor.

7. The floor fixing assembly according to claim 6,
wherein in a region of its receiving space, the frame fixing element is provided with at least one second groove for receiving one of the clamping split pins,
wherein the second groove extends substantially parallel to the plane defined by the vehicle floor, so that on connection of the frame fixing element to the retaining peg, the respective clamping split pin is guided by the second groove and moved substantially parallel to the plane defined by the vehicle floor.

8. The floor fixing assembly according to claim 1,
wherein the frame fixing element is provided with a connecting bore which is configured to receive a connecting element for connecting the leg of the frame to the frame fixing element,
wherein a longitudinal axis of the connecting bore runs substantially parallel or substantially perpendicular to a plane defined by the vehicle floor.

9. The floor fixing assembly according to claim 7,
wherein each clamping split pin is provided with a third groove configured to receive the retaining peg in the state in which the floor fixing assembly is mounted on the vehicle floor.

10. The floor fixing assembly according to claim 1,
wherein the two clamping split pins
are configured to grip the retaining peg on both sides, or
are configured to cooperate with respective outer faces of two of the retaining pegs arranged next to each other.

11. The floor fixing assembly according to claim 1, wherein the connecting piece comprises:
a first element which, in a state in which the floor fixing assembly is mounted on the vehicle floor, extends at least one of
between the clamping split pins,
substantially perpendicularly to the clamping split pins, or
substantially parallel to a plane defined by the vehicle floor.

12. The floor fixing assembly according to claim 10, wherein the connecting piece comprises:
a first element,
two second elements which extend substantially coaxially to each other and towards the outside from respective ends of the clamping split pins, and
two third elements which extend substantially parallel to each other from respective ends of the second elements and connect the second elements to the first element.

13. A frame fixing system, comprising:
a vehicle floor,
a plurality of retaining pegs fixed to the vehicle floor,
a first frame fixing element configured to be connected to a first leg of a frame to be releasably attached to the vehicle floor and comprising at least one receiving space for receiving at least one of the plurality of retaining pegs,
a second frame fixing element configured to be connected to a second leg of the frame to be releasably attached to the vehicle floor and comprising at least one receiving space for receiving at least one of the plurality of retaining pegs,
a first clamping device configured to be introduced into the at least one receiving space of the first frame fixing element in order to connect the first frame fixing element by form fit to at least one of the plurality of retaining pegs, wherein the first clamping device comprises a first clamping split pin which engages at least one of the plurality of retaining pegs, and
a second clamping device configured to be introduced into the at least one receiving space of the second frame fixing element to connect the second frame fixing element by form fit to at least one of the plurality of retaining pegs, wherein the second clamping device comprises a second clamping split pin which engages at least one of the plurality of retaining pegs,
wherein at least one of the first clamping split pin, the second clamping split pin, and the plurality of retaining pegs comprise at least one groove, and
wherein the first clamping split pin and the second clamping split pin are connected by a connecting piece that extends in a plane parallel to a plane defined by the vehicle floor and extends in a plane that is perpendicular to a plane defined by the vehicle floor; and
wherein the connecting piece is dimensioned larger than the at least one receiving space.

14. The frame fixing system according to claim 13,
wherein the retaining pegs are arranged in a row behind one another in a region of a fixing rail provided in the vehicle floor, which rail is lowered in comparison with a plane defined by the remainder of the vehicle floor,
wherein an end of the retaining peg protruding from the vehicle floor lies preferably substantially in the plane defined by a remainder of the vehicle floor.

15. An aircraft comprising a floor fixing assembly according to claim 1.

16. An aircraft comprising a frame fixing system according to claim 13.

17. A method for releasable fixing of a frame to a vehicle floor, wherein the method comprises the steps:
fixing at least one retaining peg to the vehicle floor,
placing a frame fixing element on the retaining peg such that the retaining peg is received in at least one receiving space of the frame fixing element,
inserting a clamping device in the receiving space of the frame fixing element to connect the frame fixing element to the retaining peg by form fit,
wherein the clamping device comprises a two clamping split pins, each clamping split pin engaging the at least one retaining peg and the frame fixing element,
wherein the clamping split pin, or the retaining peg, or both comprise at least one groove,
wherein the two clamping split pins are connected by a connecting piece that extends in a plane parallel to a plane defined by the vehicle floor and extends in a plane that is perpendicular to the plane defined by the vehicle floor; and wherein the connecting piece is dimensioned larger than the at least one receiving space, and
connecting a leg of the frame to the frame fixing element.

18. The method according to claim 17,
wherein a first and a second frame fixing element are each connected by form fit to at least one retaining peg each by means of a first and a second clamping device, and
wherein a first leg of the frame is connected to the first frame fixing element and a second leg of the frame is connected to the second frame fixing element.

19. The method according to claim 18, wherein the first leg of the frame is connected to the first frame fixing element by a first connecting element which is introduced into a connecting bore of the first frame fixing element, a longitudinal axis of said bore extending substantially parallel to a plane defined by the vehicle floor.

20. The method according to claim 18, wherein the second leg of the frame is connected to the second frame fixing element by a second connecting element which is introduced into a connecting bore of the second frame fixing element, a longitudinal axis of said bore extending substantially perpendicularly to a plane defined by the vehicle floor.

* * * * *